United States Patent

[11] 3,560,652

[72] Inventor George Arthur Kim
Chicago, Ill.
[21] Appl. No. 720,545
[22] Filed Apr. 11, 1968
[45] Patented Feb. 2, 1971
[73] Assignee Teletype Corporation
Skokie, Ill.
a corporation of Delaware

[54] TYPE CYLINDER POSITION MONITORING CIRCUIT
12 Claims, 4 Drawing Figs.
[52] U.S. Cl. ................................................. 178/34
[51] Int. Cl. .................................................. H04l 17/24
[50] Field of Search ........................................... 178/34, 28;
250/230; 356/150

Primary Examiner—Kathleen H. Claffy
Assistant Examiner—Thomas W. Brown
Attorneys—J. L. Landis and R. P. Miller ABSTRACT: A plurality of mirrors, each lying in a different plane and each separated from the others by nonreflective segments, are mounted on the top of a type cylinder for rotation therewith, and photocell pick up devices are arranged in two vertical columns opposite the mirrors in a number of levels equal to the number of vertical levels to which the type cylinder may be positioned. The permutation signal which causes the positioning of the type cylinder to particular vertical and rotational positions also is decoded to complete a circuit path to one only of the photocells. When the positioning of the type cylinder is completed, light is flashed onto the mirrors; and if a mirror is opposite the selected photocell, light impinges on the photocell. The output of the selected photocell then is used to indicate whether or not the proper vertical level and column selection has been made.

INVENTOR
GEORGE A. KIM

PATENTED FEB 2 1971 3,560,652

TYPE CYLINDER POSITION MONITORING CIRCUIT

BACKGROUND OF THE INVENTION

In the manufacture of telegraph printers, it is desirable to operate the printing mechanism as a test of the printer before it is packed and shipped. In order to ascertain whether or not the unit is operating properly, a predetermined message sequence is supplied to the printer and normally a printed record of this test message is provided. Visual inspection of the printed record, which is made by the printer, then is utilized in order to ascertain whether or not any malfunctioning of the printing mechanism exists. Such visual inspections are time consuming and are subject to human error due to fatigue, carelessness, and the like. Thus, it is desirable to provide some means of checking the operation of telegraph printers without reliance on such visual inspection of the printed record.

SUMMARY OF THE INVENTION

In a system in which a member is rotated to particular column positions and raised and lowered to a predetermined number of vertical positions in response to a permutation coded input signal, a light source is mounted on the member for positioning therewith. Light sensitive devices are located opposite the different positions to which the light source may be positioned; and the permutation coded input signal which caused and positioning of the member is decoded to provide a circuit path to only one light sensitive device for each different input signal. The output of the light sensitive device obtained over the selected circuit path then is used to ascertain whether or not the member has been correctly positioned.

DETAILED DESCRIPTION

Figure 1:
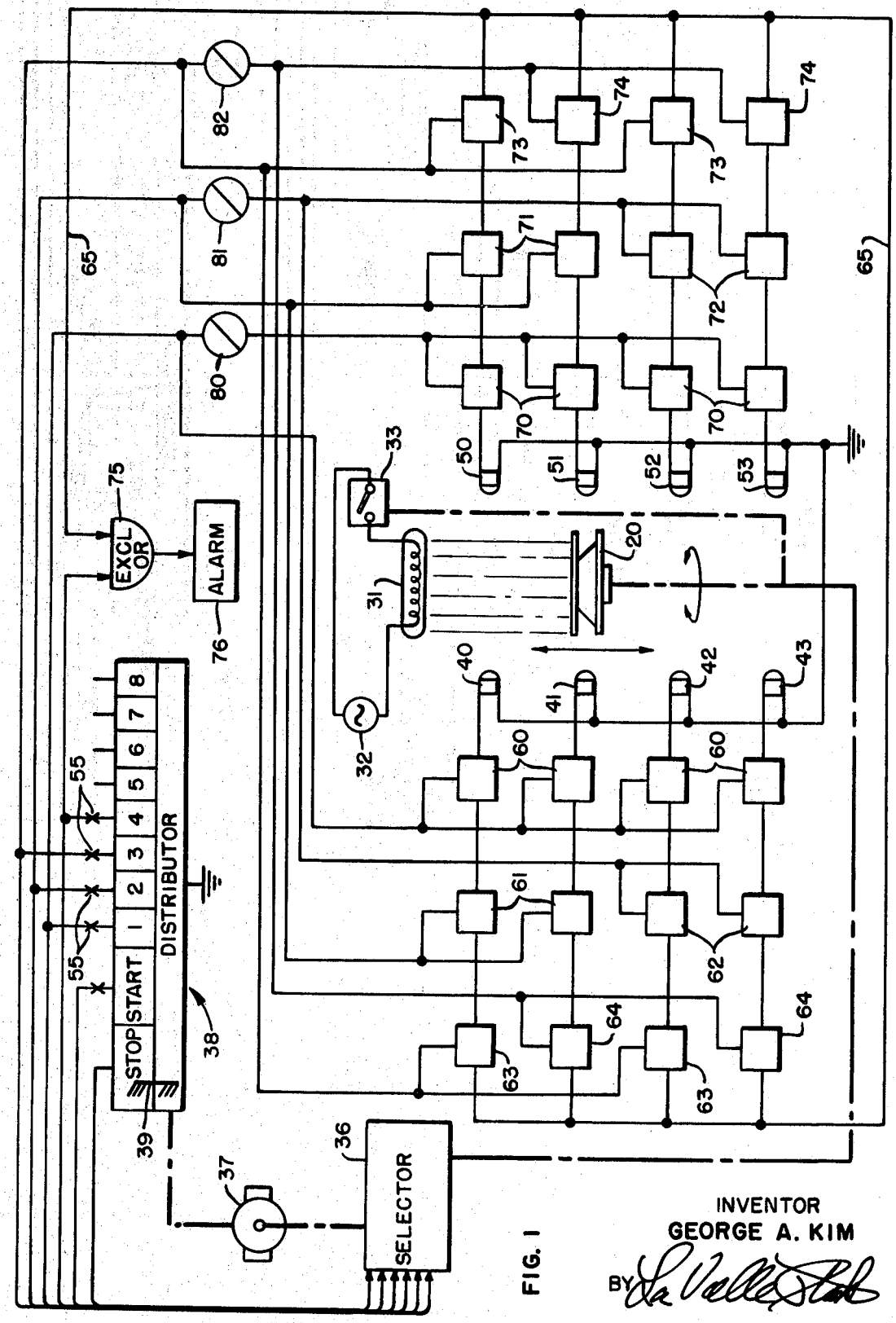
FIG. 1 is a block diagram of a preferred embodiment of the invention.

Referring now to the drawing in which the same reference numerals are used throughout the FIGS. to indicate the same elements, there is shown a preferred embodiment of a position monitoring circuit utilized to monitor the positioning of the typing cylinder employed in a telegraph printer of the type shown in U.S. Pat. No. 3,176,069 to W. J. Zenner issued on Mar. 30, 1965. The details of the typing cylinder and the mechanism for vertically and rotatively positioning it are shown in the above-mentioned patent; and since they do not constitute any part of the position monitoring circuit described herein, such details have been omitted.

Prior to entering into a discussion of the circuit shown in FIG. 1, a brief description of FIGS. 2, 3 and 4 will be given. In FIG. 2 there is shown a latching switch 10 of the type used in the circuit of FIG. 1 to provide circuit paths to a plurality of photocells. The latching switch 10 includes a relay 11 connected to a source of positive potential and to an input lead 12 shown entering the switch 10 from the top. Whenever ground potential is applied on the lead 12, the relay 11 operates, closing its contacts 13 and 14, whereupon the relay remains locked to ground over the path extending from the source of positive potential through the now closed contact 14 and through a normally closed reset contact 15 is subsequently opened, the latching switch 10 provides a circuit path extending over the leads shown extending from the left and right sides of the switch 10 through the contact 13. Although the latching switch 10 has been illustrated as a relay switch, other types of latching switches could be employed so long as the switches provide a current path over the leads extending through them in response to the application of an operating pulse.

Figure 3:
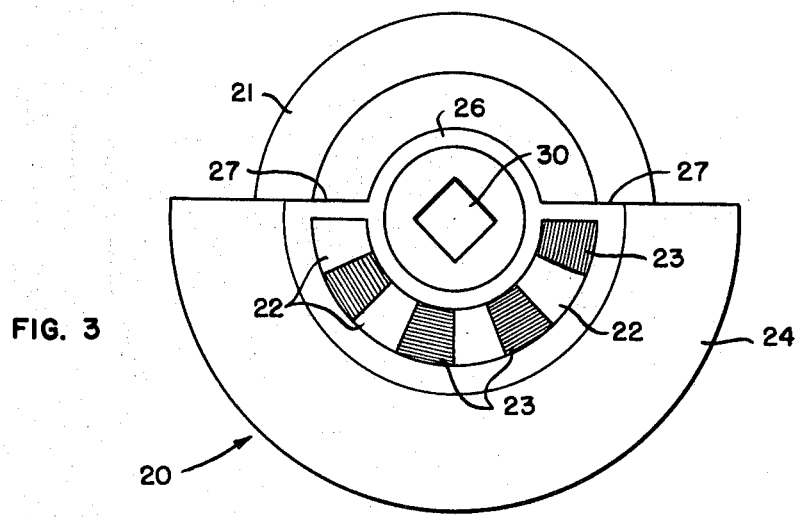
FIGS. 3 and 4 show details of the mirror assembly utilized in the preferred embodiment of the invention shown in FIG. 1.
Figure 4:
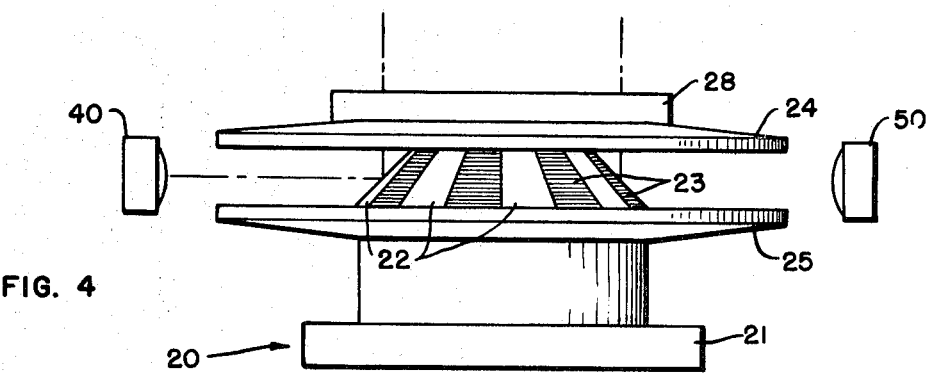

Referring now to FIGS. 3 and 4, there is shown in detail a rotary mirror assembly 20 which is to be mounted on the upper surface of a type cylinder 21 of the type described in the above-mentioned patent. The mirror assembly 20 consists of four mirrors, or reflective segments 22, separated by four non-reflective plates or segments 23 arranged over 180° of a circle and mounted at a 45° angle with respect to the axis of the type cylinder 21. The segments 22 and 23 are positioned to correspond to each of the incremental rotation positions to which the type cylinder 21 may be located, so that the angular separation between adjacent segments is equal to the angle of each discrete rotational increment which may be made in the positioning of the type cylinder 21.

In order to present spurious light reflections from reaching photocells other than the one opposite the location corresponding to the position of the type cylinder, it is necessary to shield the mirror assembly so that only light from a light source located directly above the mirror assembly in alignment with the axis of the type cylinder 21 may impinge upon the mirror segments 22 and 23; and further to prevent the light reflected from the reflective mirror segments 22 from reaching photocells other than the one adjacent the location which is to be selected by the position of the mirror. This shielding is accomplished by an upper semicircular shield 24 and a lower semicircular shield 25. The lower shield 25 extends from the lower surface of the mirror segments 22 and 23 outwardly therefrom as best seen in FIG. 4. The upper shield similarly extends outwardly from the mirror segments 22 and 23 but has a semicircular aperture therein to allow light directed along the axis of the type cylinder to be directed onto the segments 22 and 23. In order to accomplish this, the upper shield 24 is provided with a support flange 28 along the inner edge, and the flange 28 is connected to an inner member 26 by means of a pair of support arms 27. The inner member 26 then is fastened to the top of the mirror assembly.

The entire mirror assembly 20 then is secured to the top of the type cylinder by means of any suitable connector, such as the bolt 30 shown in FIG. 3. As a result, the mirror assembly 20 is positioned vertically with the type cylinder and rotates with the type cylinder. Two columns of photocells or light responsive switches then are mounted 180° apart on opposite sides of the mirror assembly 20 mounted on the type cylinder 21. The number of the photocells in each column corresponds to the number of vertical positions to which the type cylinder can be located; and in FIG. 4, the photocells 40 and 50 for a single vertical position are shown relative to the mirror assembly 20.

Figure 2:
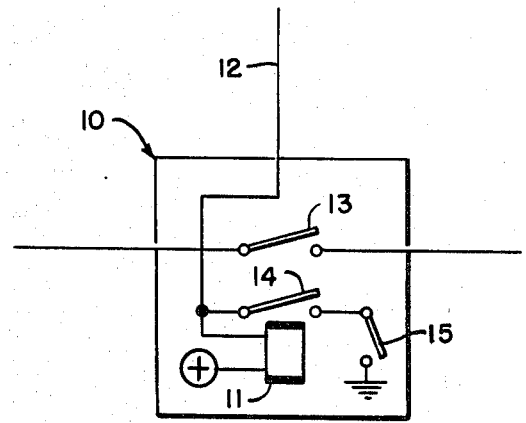
FIG. 2 shows details on one of the circuit elements used in the block diagram of FIG. 1.

Referring now to FIG. 1, there is shown a circuit for checking the position of a type cylinder using the rotary mirror assembly mounted on the type cylinder. For the purpose of illustration, the type cylinder may be considered capable of being positioned in one of four levels vertically and in any one of 16 columns rotationally to present the desired character at the time the hammer is driven against the type cylinder. The positioning of the type cylinder is accomplished in accordance with a permutation coded input character, the first bit of which establishes whether the type cylinder is to rotate to the left or to the right from a home position. This first bit, therefore, limits the selection of characters to a character in one of eight out of the possible 16 columns carried on the type cylinder. The second and third bits of the input signal ascertain to which of the four vertical levels the type cylinder is to be positioned, and the fourth bit selects odd or even columns out of the eight columns selected by the first bit. The circuit shown in FIG. 1 monitors the position attained by the type cylinder in response to these first four bits of the permutation coded input character, and provides a sufficient degree of accuracy for test purposes to ascertain whether or not the type cylinder positioning mechanism is responding properly to the input signals.

A lamp 31 supplied with power from a suitable power source 32 through a normally opened switch 33 is located directly above the segmented mirror assembly 20 which is mounted on the type cylinder to be tested. Two columns of four photocells 40—43 and four photocells 50—53 are located on opposite sides of the segmented mirror assembly 20 and are in alignment with each of the four vertical levels to which the type cylinder may be positioned.

The positioning of the type cylinder and the segmented mirror assembly 20, attached thereto, and the control of the switch 33 is effected mechanically by a conventional selector mechanism 36 driven by a motor 37 which also controls the operation of a conventional distributor 38 from which the permutation coded input signals or characters are obtained. The signals from the distributor 38 are supplied to the selector 36 causing it to operate in a conventional manner. The motor 37, selector 36, and distributor 38 may be of any suitable type but preferably of the type shown in the above-mentioned Zenner patent.

Under control of the motor 37, the distributor 38 is caused to sequentially scan all of its possible outputs which, with the exception of the conventional stop and start signals, may be connected through the normally open contacts 55 of a conventional tape reader used to read permutation coded paper tape. Such a tape reader provides a closure of a contact 55 associated with any level in which a hole or perforation in the tape occurs, and causes the switches 55 associated with levels of character on a tape in which no perforation occurs to remain open. The sensing of a hole corresponds to the sensing of a "mark" for that level of the tape in which the hole is sensed and the sensing of no hole corresponds to a "space" for that level of the tape in which no hole is sensed. Thus, as the distributor 38 is operated, the outputs obtained from a level in which a space occurs correspond to an open line condition; and when a segment of the distributor is scanned by brushes 39 for a level in which the switch 55 is closed, ground potential is connected from a common ring of the distributor 38 to the distributor segment for that level and through the now closed switch 55 to the output lead extending from that segment of the distributor 38.

As stated previously, the first three bits of the character cause the right or left rotary selection and vertical level to which the type cylinder is to be positioned. While the output of the distributor 38 initiates the mechanical positioning of the type cylinder through the selector 36, the same pulses which cause the mechanical positioning are supplied to latching switches (similar to latching switch 10 of FIG. 2), three of which are connected in series with each of the photocells 40—43 and 50—53. The latching switches are supplied with input signals in such a manner that upon completion of the first three bits of the character, only one of the photocells 40—43 and 50—53 is provided with a current path completed through the three latching switches connected in series with it.

The pulses obtained from the distributor 38 occur serially, with the first pulse being applied directly to the four latching switches 60 associated with the photocells 40—43 and being inverted by an inverter 80 and supplied to the four switches 70 associated with the photocells 50—53. If the first bit of the character is a mark (corresponding to a closed contact 55 connected to the output of the first level of the distributor), a ground potential is applied to the switches 60 causing these switches to operate closing their contacts 13 (see FIG. 2). At the same time, the inverter 80 provides a positive potential to the inputs of the latching switches 70, so that these switches remain open. On the other hand, if the first pulse corresponds to a space (the contact 55 associated with the first level of the distributor being open), the inverter 80 supplies ground potential to the switches 70 causing those switches to be closed while the switches 60 remain open. The second pulse obtained from the second level of the distributor 38 is one of the vertical positioning pulses and is supplied directly to the pairs of switches 61 and 71 corresponding to the photocells 40, 41, 50 and 51 associated with the two upper levels of the vertical positioning. This second pulse also is supplied through an inverter 81 to the pairs of switches 62 and 72 associated with the photocells 42, 43, 52 and 53 for the two lower levels of vertical positioning. Similarly, the third pulse obtained from the distributor 38 is applied directly to the pairs of switches 63 and 73 and is inverted by an inverter 82 and applied to the pairs of switches 64 and 74 for the second and fourth levels of vertical positioning.

By way of example, assume that the first, second and third bits of the input character are marking, so that the contacts 55 associated with these levers all are closed. This causes the switches 60, 61 and 63 to be closed in sequence, and the only completed path through three series-connected switches to any one of the photocells 40—43 and 50—53 is through the switches 60, 61 and 63 connected in the circuit of the photocell 40. The fourth pulse (bit) obtained from the distributor operates through the selector 36 to cause an odd or even column positioning of the type cylinder. If this fourth pulse is marking, it causes the type cylinder to be turned to an even column which places one of the reflective segments 22 of the mirror 20 in alignment with the photocell 40. After completing the positioning of the type cylinder following this fourth bit of the character, the selector 36 momentarily closes the switch 33 energizing the lamp 31 to cause a flash of light to emanate therefrom. When the lamp 31 is flashed, the photocell 40 then should be illuminated and should conduct, causing ground potential to be applied through the photocell 40 and through the now closed switches 60, 61 and 63 over a lead 65 to the upper input of an exclusive OR gate 75.

At the same time, since the fourth bit is a marking bit, ground potential is a marking bit, ground potential is applied from the distributor through the now closed contact 55 for the fourth level of the distributor to the lower input of the exclusive OR gate 75. The output of the exclusive OR gate 75 is connected to an alarm circuit 76; and whenever both inputs to the exclusive OR gate 75 are the same, the output of the gate is such that the alarm 76 is not energized. This is an indication that the mechanical positioning of the type cylinder is correct. At the end of a cycle of operation, the selector 36 or the distributor 38 may be provided with a means such as a cam for opening all of the contacts 15 in all of the latching switches 60—64 and 70—74 to cause the latching switches to be reset in preparation for the next character.

If for some reason, the type cylinder is not positioned to the proper vertical level or is not rotated to an even column upon receipt of the fourth pulse, no light impinges upon the photocell 40, and an open line condition is applied to the upper input of the exclusive OR gate 75 at the time that the ground potential for the fourth pulse is applied to the lower input of the gate 75. In this event, the output of the OR gate 75 causes the alarm 76 to be energized, indicating improper operation of the type cylinder positioning mechanism.

Assume that the first three pulses cause the same photocell path for the photocell 40 to be completed as in the above example, but that the fourth bit now is a spacing bit causing an open line condition to be applied to the lower input of the exclusive OR gate 75. This spacing bit also should cause the type cylinder to be positioned to an odd column, so that a darkened segment 23 of the mirror assembly 20 is placed in alignment with the photocell 40. Thus, when the lamp 31 is flashed, no light is reflected onto the selected photocell 40. In such an event, an open line condition also is applied to the upper input of the exclusive OR gate 75, so that the alarm 76 is not operated. The distributor then continues to operate through another cycle supplying the next character.

In the event that incorrect positioning of the type cylinder takes place, so that light does impinge upon the photocell 40 during the spacing fourth bit of the last example, ground potential is applied to the upper input of the exclusive OR gate 75 while an open line condition is applied to the lower input of the gate. In such an event, the output signal obtained from the exclusive OR gate causes the alarm 76 to be energized.

Other combinations of the first three pulses taken in conjunction with the fourth pulse provide similar operation with respect to each of the seven other photocells as may be readily apparent from an examination of the circuit diagram in FIG. 1.

If desired, operation of the alarm 76 could be used to terminate further operation of the apparatus until correction is made, or the alarm 76 could be in the form of a counter to count the number of positioning errors which occur.

It should be noted that the circuit shown in FIG. 1 always provides an accurate error check for the odd or even column positioning and proper vertical level if the fourth bit of the character causing the positioning is a marking bit. In the event, however, that the fourth bit is a spacing bit, it is possible for the type cylinder and the mirror assembly to be in the wrong vertical level so that a negative or spacing indication is obtained from the photocell bank; and a negative input is supplied to the lower input of the exclusive OR gate 76 coinciding with a spacing or open line condition applied to the upper input of the OR gate 75. As stated previously, this causes the output from the gate 75 to be indicative of an error-free condition, so that the alarm 76 is not energized. Even though the system shown in FIG. 1 is not capable of detecting position errors of this specific type when the fourth bit is a spacing bit, the system is capable of detecting a sufficient amount of malfunctioning of the positioning mechanism for test purposes. If desired, an increased number of photocell columns could be provided with additional switches controlled by subsequent bits of the character to provide an even more accurate monitoring of the positioning mechanism.

It also should be noted that although a light source and photocells are used in the preferred embodiment to detect the position of the type cylinder, other detection devices responsive to heat, etc., could be used in place of the light responsive devices disclosed.

Although the invention has been described in conjunction with the particular embodiment shown in the drawings, other modifications of this position monitoring circuit varied to fit particular operating conditions will be apparent to those skilled in the art; and the invention is not to be considered limited to the embodiment chosen for purposes of disclosure but covers all changes and modifications which do not constitute departures from the true scope of the invention.

I claim:

1. In a system for monitoring the positioning of a member in response to permutation coded input signals:
   a source of light;
   a light directing means mounted on said member for positioning therewith;
   a plurality of light responsive switches located opposite different locations to which the light can be directed by the directing means and responsive to the directed light to become conductive;
   means responsive to different combinations of said permutation coded input signals and connected in series with each of the light responsive switches for providing a circuit path from a source of current and voltage to a selected different light responsive switch for each different input signal; and
   means responsive to the conduction of the selected light responsive switch on the circuit path for indicating the presence of an error in the positioning of said member.

2. A system according to claim 1 wherein:
   the light directing means includes a mirror mounted on said member for positioning therewith; and
   the light source is located to project light onto the mirror.

3. A system according to claim 2 wherein said mirror is located on said member at an angle of substantially 45° relative to the light beam emanating from the light source.

4. A system according to claim 1 wherein the light responsive switches are photocells 5. A system according to claim 1 in which the path providing means include latching switches operated in response to the permutation coded input signals.

6. A system for detecting the correct positioning of a member in response to permutation coded signals having a predetermined number of elements including:
   a source of light;
   a light directing means mounted on said member for positioning therewith;
   a plurality of photocells located adjacent different positions to which the light can be directed by the directing means and responsive to the directed light to become conductive;
   means responsive to predetermined elements of said permutation coded signals and connected in series with each of the photocells for completing a circuit path to a selected different photocell for each different permutation of said predetermined elements; and
   means responsive to conduction of the selected photocell on the completed circuit path and to at least one predetermined element of said permutation coded signal for indicating the presence of an error in the positioning of said member.

7. Apparatus according to claim 6 wherein:
   the light directing means includes a plurality of mirrors mounted on said member; and
   nonreflective plates are mounted between the mirrors to separate the mirrors from each other.

8. Apparatus according to claim 7 wherein:
   the member is rotationally incrementally positioned; and
   the mirrors and the nonreflective plates are angularly disposed relative to one another by the same number of degrees which occur in each rotational increment of said member.

9. In a system for detecting the accuracy of the positioning of the type cylinder in a telegraphic printer wherein the type cylinder is positioned to one of a plurality of axial positions and one of a plurality of rotational positions in response to a permutaton coded input signal having a predetermined number of signal elements:
   a light source for providing light in a direction parallel to the axis of rotation of the type cylinder;
   a plurality of mirrors mounted on said type cylinder in alignment with light emanating from the light source;
   a plurality of photocells located adjacent different axial and rotational positions to which the mirrors can be positioned by the type cylinder;
   switching means operated by a predetermined number of the elements of the input signal which is less than the total number of elements of said signal for providing conductive paths in series with the photocells, a different path to a selected different photocell being completed for each different permutation of said predetermined number of elements of the signal; and
   means responsive to an output signal from the selected photocell on the completed conductive path and a signal obtained from at least one other element of the input signal for providing an output indicative of the correct or incorrect positioning of the type cylinder.

10. A system according to claim 9 in which the photocells are located in two banks, 180° apart on each side of the mirrors, with the banks having a number of axial positions equal to the number of axial positions to which the type cylinder can be positioned.

11. Apparatus according to claim 10 wherein:
    the type cylinder is rotationally incrementally positioned; nonreflective plates are mounted between the mirrors to separate the mirrors from each other; and
    the mirrors and the nonreflective plates are angularly disposed from one another by the same number of degrees as the number of degrees in each rotational increment to which the type cylinder can be positioned.

12. A position monitor for use with type cylinder positioning devices of the kind in which signal bits control the axial and rotational positioning of a type cylinder and in which one of said signal bits controls the rotational positioning of the type cylinder by causing the positioning of the cylinder in a first position whenever said one of said signal bits is in one binary mode and by causing the positioning of the cylinder in the next adjacent position whenever said one of said signal bits is in the other binary mode, including:

a photosensitive device;

means for providing a conductive path to the photosensitive device whenever said signal bits cause the positioning of said type cylinder in the said first position;

means positioned by said type cylinder for directing light onto the photosensitive device whenever said type cylinder is in said first position to actuate the photosensitive device; and means for gating said one of said signal bits with the output of the actuated photosensitive device to produce an output indicative of the correct positioning of said type cylinder whenever said one of said signal bits is in said one of the binary modes and the photosensitive device produces an output or whenever said one of said signal bits is in said other of the binary modes and the photosensitive device produces no output.